No. 843,850. PATENTED FEB. 12, 1907.
P. E. SMIDESANG.
NEST.
APPLICATION FILED SEPT. 19, 1906.
2 SHEETS—SHEET 1.
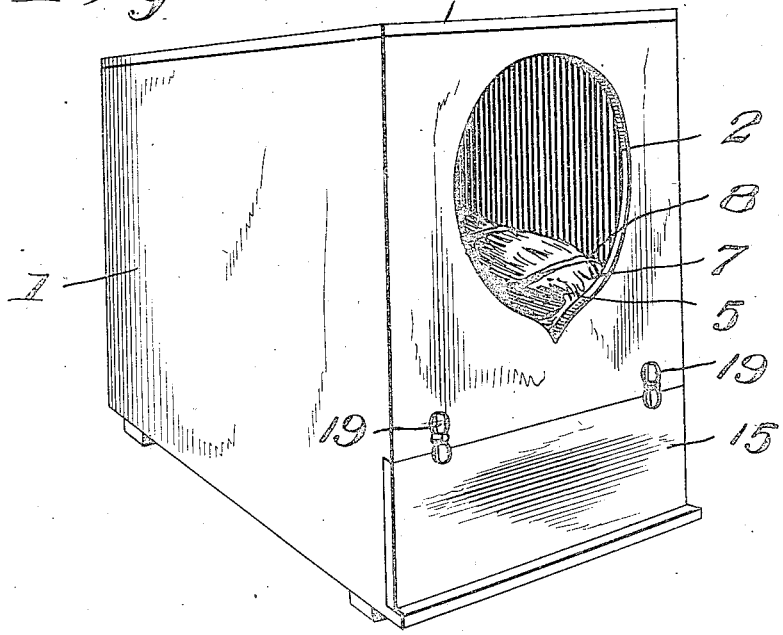
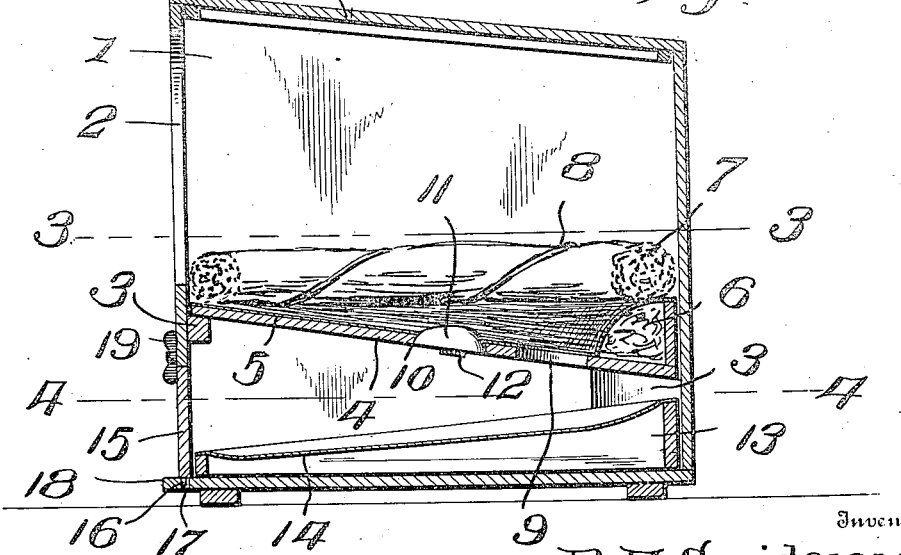
Witnesses
Thos. W. Riley
Lucie Anderson
Inventor
P. E. Smidesang
By W. J. FitzGerald
Attorneys No. 843,850. PATENTED FEB. 12, 1907.
P. E. SMIDESANG.
NEST.
APPLICATION FILED SEPT. 19, 1906.

2 SHEETS—SHEET 2.

Witnesses
Thos. W. Riley
Lucie Anderson

Inventor
P. E. Smidesang
By W. J. FitzGerald & Co.
Attorneys

UNITED STATES PATENT OFFICE.

PEDER E. SMIDESANG, OF WYLIE, MINNESOTA.

NEST.

No. 843,850.  Specification of Letters Patent.  Patented Feb 12, 1907.

Application filed September 19, 1906. Serial No. 335,338.

*To all whom it may concern:*

Be it known that I, PEDER E. SMIDESANG, a citizen of the United States, residing at Wylie, in the county of Red Lake and State of Minnesota, have invented certain new and useful Improvements in Nests; and I do hereby declare the following to be a full, clear, and exact description of the invention, such as will enable others skilled in the art to which it appertains to make and use the same.

My invention relates to new and useful improvements in nests, and more particularly to that class adapted to be used for poultry; and my object is to provide a device of this class whereby the egg will be immediately removed from the nest and deposited in a suitable receptacle, thereby obviating any possibility of the egg becoming heated by the fowl remaining upon the nest.

A further object is to provide suitable means for constructing the nest so that the same will have a soft and pliable surface.

A further object is to provide means for retaining a decoy-egg within the nest.

A still further object is to provide suitable means for removing certain parts of the nest, whereby the same may be thoroughly cleansed and sterilized.

Other objects and advantages will be hereinafter referred to in the specification, and more particularly pointed out in the claims.

Figure 3:
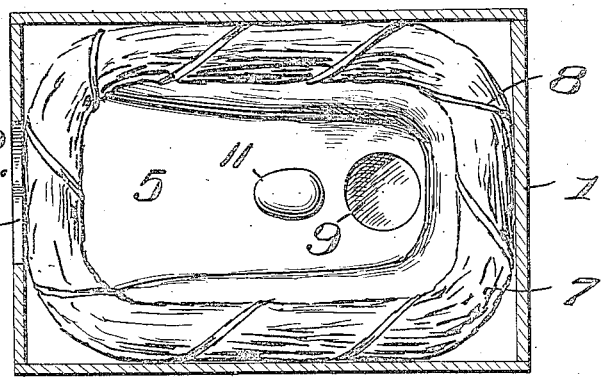
Figure 4:
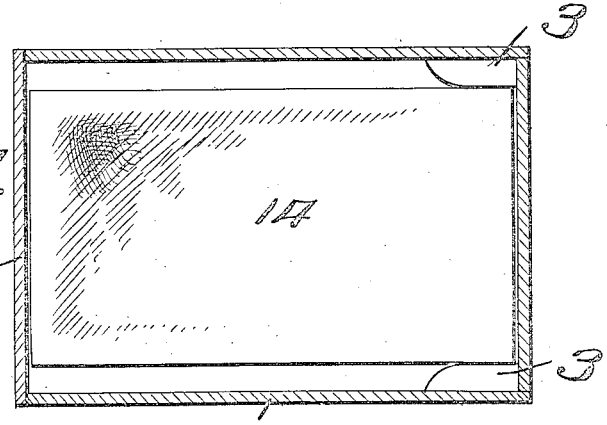
Figures 5, 6:
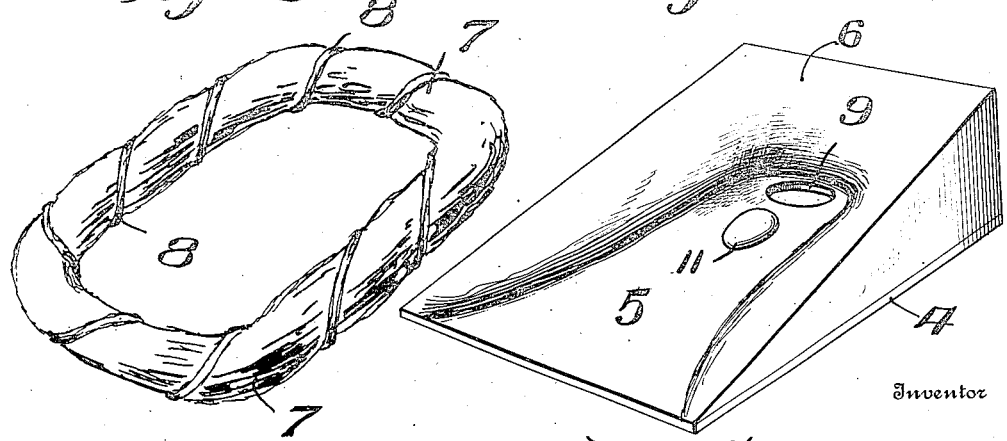

In the accompanying drawings, which are made a part of this application, Figure 1 is a perspective view of my improved nest complete. Fig. 2 is a central longitudinal sectional view thereof. Fig. 3 is a horizontal sectional view on the line 3 3, Fig. 2. Fig. 4 is a horizontal sectional view on the line 4 4, Fig. 2. Fig. 5 is a perspective view of a device to form the upper portion of the nest; and Fig. 6 is a perspective view of the floor of the nest and parts carried thereby.

Referring to the drawings, in which similar reference-numerals designate corresponding parts throughout the several views, 1 indicates a housing in one end of which is provided a suitable opening 2, by which means a fowl may gain access to the housing.

Mounted on suitable supports 3, within the housing 1, is the floor 4 of the nest proper, which is preferably disposed at an angle, so that any object deposited thereon will be directed to the rear end of the housing. The upper surface of the floor 4 is preferably provided with any form of cushioning material 5, as oil-cloth or the like, while the rear end and two sides of the floor are provided with padding 6, preferably excelsior, secured in place by the cushioning material.

Extending entirely around the interior of the housing 1 and resting upon the padding 6 is a ring 7, preferably constructed by assembling together a quantity of hay, grass, or the like and binding the same with any suitable material, such as a cord 8, so that the material will be held into the form of a roll and holding the same from becoming separated or destroyed. The ring 7 is adapted to form the upper portion of the nest proper and give the same the appearance of being entirely constructed from straw, and it also provides a pliable rest for the hen when sitting upon the nest.

The floor 4 is provided near its rear end with an opening 9 of sufficient size to allow an egg to pass therethrough, and said floor is also provided near its central portion with an opening 10, in which is secured a decoy-egg 11, said egg being held within the opening 10 in any manner, as by disposing a cleat 12 below the opening 10, the opening 10 being so formed that it will fit the contour of the egg 11 and prevent the same from moving upwardly through the opening.

In order to prevent the egg from becoming broken when descending through the opening 9, I have disposed in the lower portion of the housing 1 a frame 13, over the upper surface of which is disposed a covering 14, preferably of oil-cloth, the frame 13 being higher at the rear end than at the front end, so that the egg will travel over the surface of the covering 14 and be deposited near the front end of the housing 1.

In the front portion of the housing 1 I have provided a door 15, through which I am enabled to gain access to the lower portion of the housing 1, thereby enabling me to readily remove the eggs deposited upon the frame. It will also be seen that the frame 13 may be readily removed from the housing, so that the same may be cleansed and renovated. The lower edge of the door 15 is provided with pins 16, which take into suitable bores in the projecting end 18 of the floor of the housing 1, so that the lower edge of the door will be held rigidly in position, and the upper edge of the door is held in its closed position through the medium of suitable buttons 19, secured to the front wall of the housing 1. In order to gain ready access to the interior of the housing 1, I have provided a closure 20 for the upper end thereof, so that by removing said closure the ring 7 and floor 4 may be readily removed from the housing.

It will be seen that I have provided a convenient nest which may be moved from place to place and one wherein the eggs will not become broken when deposited therein, and it will also be seen that the egg will immediately descend into the compartment below the nest as soon as the fowl leaves the housing, so that the egg will not become heated by another fowl entering the housing. It will be further seen that I have so constructed my improved nest that the several parts thereof may be readily removed from the housing and thoroughly cleansed and sterilized.

What I claim is—

1. In a device of the class described, the combination with a suitable housing having an opening in one end thereof, of an inclined floor in said housing, a padding on said floor, a cushioning-ring disposed around the edges of said floor and resting upon said padding, said floor having an opening therethrough near its inclined end and means below said opening to catch the eggs descending through the opening.

2. In a device of the class described, the combination with a housing having an opening in one end thereof, of an inclined floor having an opening therein, a covering on said floor, a padding for said floor, a cushioning-ring resting on said padding, a frame below said floor and a flexible device on said frame adapted to receive and prevent the breakage of eggs descending through said opening in the floor.

3. In a device of the class described, the combination with a housing having an opening in one end thereof, of an inclined floor in said housing having an opening near its rear end, a padding on said floor, a flexible cushioning-ring disposed upon said padding, a decoy-egg secured in an opening in said floor, a tapered frame below said floor, a flexible covering for said frame and a door in the forward end of said housing.

4. In a device of the class described, the combination with a housing having an opening in one end thereof, a removable cover for said housing and a door in one end of said housing below the opening therein, of an inclined floor having an opening near its rear end, a covering for said floor, a padding secured to said floor, a cushioning-ring above said padding, said ring and floor being removably secured in said housing, a tapered frame below said floor and a flexible covering for said frame.

In testimony whereof I have signed my name to this specification in the presence of two subscribing witnesses.

PEDER E. SMIDESANG.

Witnesses:
B. E. BURKEE,
WM. EICKHOFF.